United States Patent [19]

Lo

[11] 4,441,141
[45] Apr. 3, 1984

[54] LIGHT REFLECTOR UNIT FOR A PHOTOGRAPHIC CAMERA

[76] Inventor: Anthony T. S. Lo, 'Woodgreen' 62 Conduit Rd., Hong Kong, Hong Kong

[21] Appl. No.: 385,404

[22] PCT Filed: Sep. 17, 1981

[86] PCT No.: PCT/GB81/00193
§ 371 Date: May 24, 1982
§ 102(e) Date: May 24, 1982

[87] PCT Pub. No.: WO82/01258
PCT Pub. Date: Apr. 15, 1982

[30] Foreign Application Priority Data
Mar. 16, 1981 [GB] United Kingdom ............... 8108102

[51] Int. Cl.³ .......................................... G03B 15/02
[52] U.S. Cl. ................................... 362/17; 362/268; 362/297; 362/307; 362/308; 362/309; 362/328; 362/346; 362/355; 362/396; 362/433
[58] Field of Search ............... 362/17, 268, 297, 307, 362/308, 309, 328, 346, 355, 396, 433

[56] References Cited
U.S. PATENT DOCUMENTS
3,737,226 6/1973 Shank .................................. 362/16
4,333,127 6/1982 Alkema et al. .................... 362/17

Primary Examiner—Stephen J. Lechert, Jr.
Attorney, Agent, or Firm—Maky, Renner, Otto & Boisselle

[57] ABSTRACT

A light reflector unit (12) for use with a photographic camera (10) for reflecting light from a light source (13), such as a flash gun, towards the subject to be photographed, the unit (12) comprising a hollow casing (15) having a window (16) for admitting light from the light source (13) into the casing (15), means (28) within the casing 15 for splitting the admitted light and for condensing the split light into separate beams of light, reflective surfaces (26) within the casing (15) for deflecting each beam of light to one of a plurality of windows (18) located such that when the reflector unit (12) is positioned on a camera (10) they face in the same direction as the lens of the lens unit (11) of the camera (10) and are disposed at discrete locations around the lens unit (11).

12 Claims, 19 Drawing Figures

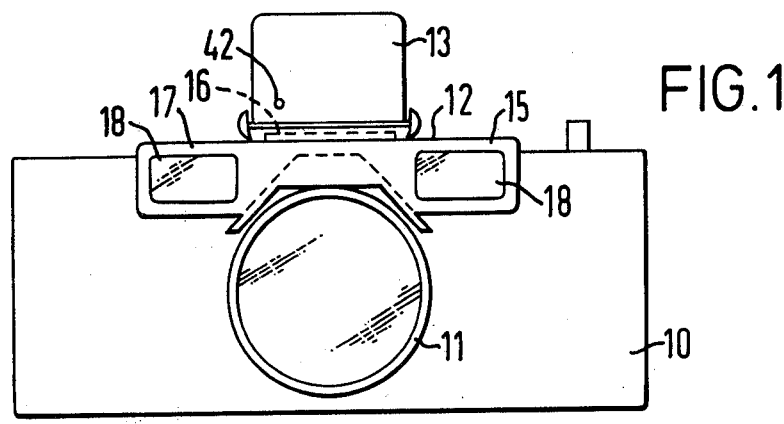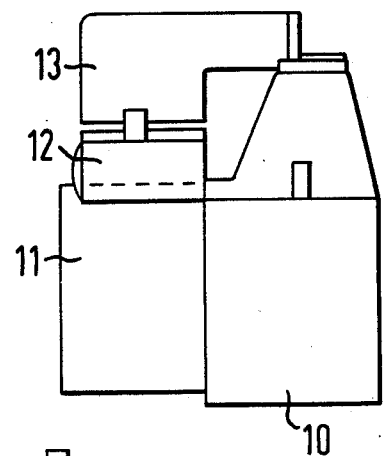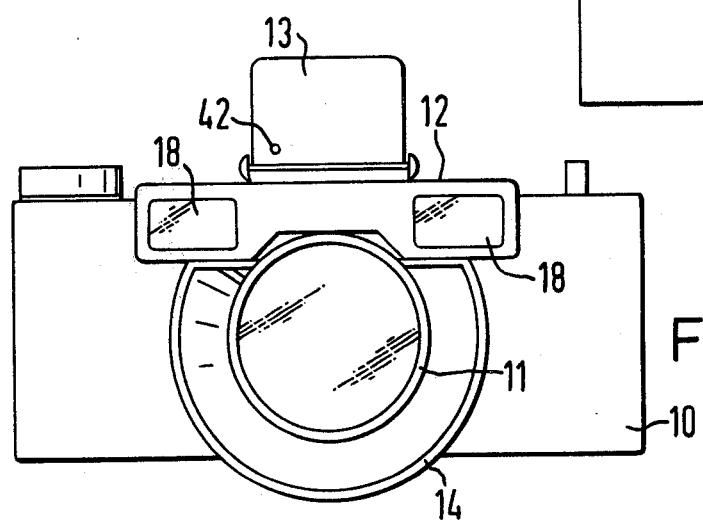

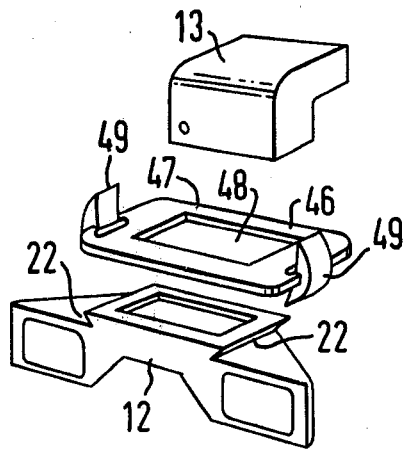
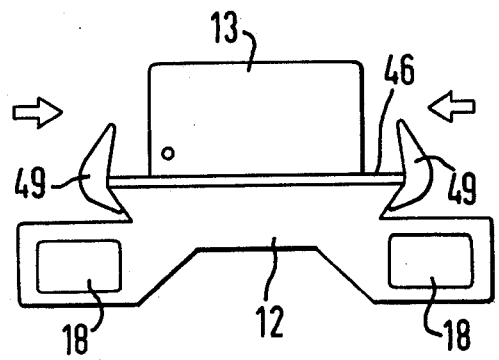
FIG.12
FIG.13
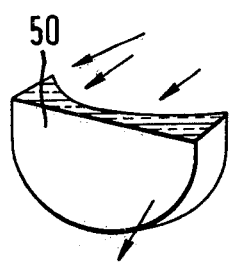
FIG.14
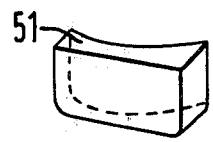
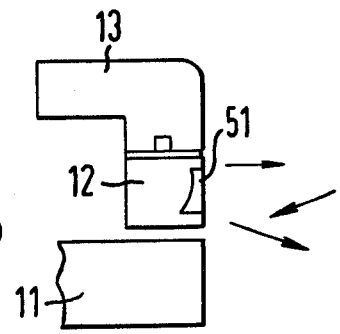
FIG.15

LIGHT REFLECTOR UNIT FOR A PHOTOGRAPHIC CAMERA

This invention relates to a light reflector unit for use with a photographic camera for reflecting light from a light source towards a subject to be photographed. When using a camera with a conventional flash gun mounted on top of the camera to take close-up photographs of a subject there are problems due to parallax and this produces uneven illumination of the subject.

In order to overcome the problems of parallax and to produce an even illumination of the subject a "ring flash" unit is known which consists of an annular flash tube which surrounds the lens unit of the camera. The disadvantages of a "ring-flash" unit are that it requires a power pack which is remote from the flash unit, it is expensive to manufacture and because of the large flash tube it requires a large power pack. Also the "ring-flash" unit can not be used as a constant light source, i.e., one that can be used to illuminate the subject before the photograph is taken in order to enable the photographer to view the illuminated subject before actuating the shutter of the camera.

The light reflector unit according to the present invention is one that has the advantages of a "ring-flash" unit but which does not suffer from the disadvantages of a "ring-flash unit" and which can be used with a conventional flash gun and with a constant light source.

According to the present invention there is provided a light reflector unit for use with a photographic camera for reflecting light from a light source towards a subject to be photographed, comprising a hollow casing which can be positioned on a camera between the light source and the lens unit of the camera, a window in the casing for admitting light from a said light source into the casing, means within the casing for splitting the admitted light, means for condensing at least some of the admitted light into two or more beams of light, light reflective surfaces within the casing for deflecting each beam of light to one of a plurality of light emitting outlets located on the casing at a position such that when said casing is positioned on a camera the outlets face in the same direction as the lens of the lens unit and are disposed at discrete locations around the lens unit, or said light reflective surfaces deflect the beams to an annular outlet located on the casing such that it faces in the same direction as the lens of the lens unit and surrounds the lens unit, the or each outlet being provided with a lens or a diffuser.

Some embodiments of the present invention will now be described, by way of examples, with reference to the accompanying drawings, in which:

FIG. 1 is a diagrammatic front view of a camera provided with a light source and a light reflector unit according to the present invention;

FIG. 2 is a side view of the camera and attachments shown in FIG. 1;

FIG. 3 is a diagrammatic front view of a camera provided with a light source, a light reflector unit according to the present invention, and a light reflector surrounding the lens;

FIG. 12 is a diagrammatic exploded perspective view of the flash gun, light reflector unit and clip member for fastening the light reflector unit to the flash gun;

FIG. 13 is a diagrammatic view showing the clip member fastening the light reflector to the flash gun;

FIG. 14 shows perspective views of two camera lens which can be used in the outlet windows of the light reflector unit;

FIG. 15 is a diagrammatic illustration showing the light paths from the llight reflector unit;

FIGS. 1 and 2 show a camera 10 provided with a lens unit 11. Located above the lens unit 11 is a light reflector unit 12 according to the present invention. Mounted on top of the light reflector unit 12 is a conventional flash gun 13 which has its light emitting face facing the upper side of the light reflector unit 12. The flash gun 13 can be connected to the accessory shoe of the camera 10 as will be described in greater detail hereafter.

Figures 4, 5:
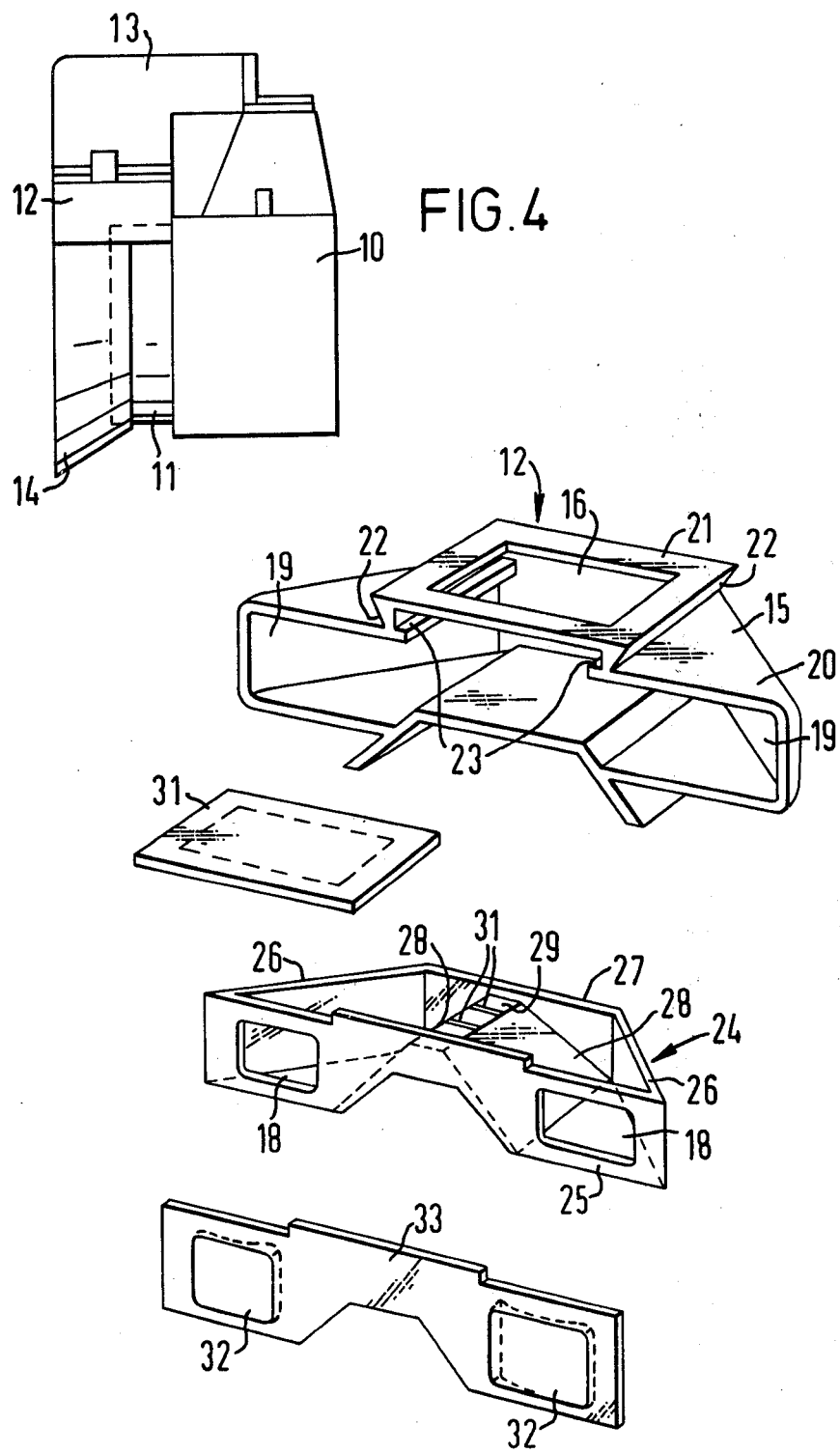
FIG. 4 is a side view of the camera and attachments shown in FIG. 3.
FIG. 5 is an exploded view of the light reflector unit, showing the component parts thereof.

FIGS. 3 and 4 show a frusto-conical reflector member 14 which partly surrounds the lens unit 11.

The light reflector unit 12 comprises a hollow casing 15 formed of suitable light impervious material such as metal or plastics material. The upper wall of the casing 15 is provided with a window 16 which may be open or closed by a transparent closure. The front wall 17 of the casing 15 is provided with two windows 18.

On the inside of the casing 15 some of the surfaces are provided with light reflective material, such as mirrored material, polished metal material, etc.

A preferred embodiment of the light reflector unit 12 is shown in FIG. 5. The casing 15 has end walls 19 which are forwardly inclined. Provided on the upper wall 20 of the casing 15 is a raised portion 21 in which the window 16 is provided, the ends of the raised portion being upwardly and outwardly inclined to form a channel 22. The raised portion 21 is also provided with undercut inwardly facing recesses 23 located in a plane beneath the window 16. The front of the casing 15 is open to receive a unit 24 which comprises a hollow member having a front wall 25 provided with the windows 18, inclined end walls 26 and a rear wall 27. The bottom wall of the unit 24 has two upwardly inclined surfaces 28 which at their upper end terminate in a transverse opening 29 which is divided into a plurality of openings by webs 30. The surfaces of the inclined end walls 26 and the inclined surfaces 28 are covered with a light reflective material. The inclined surfaces 28 and the opening 29 form a light splitter.

The window 16 is covered by a diffuser 31 which engages the recesses 23. Each window 18 is closed by a lens 32 carried on a cover plate 33. The component parts of the unit 12 can be held together in any suitable manner.

Figure 6:
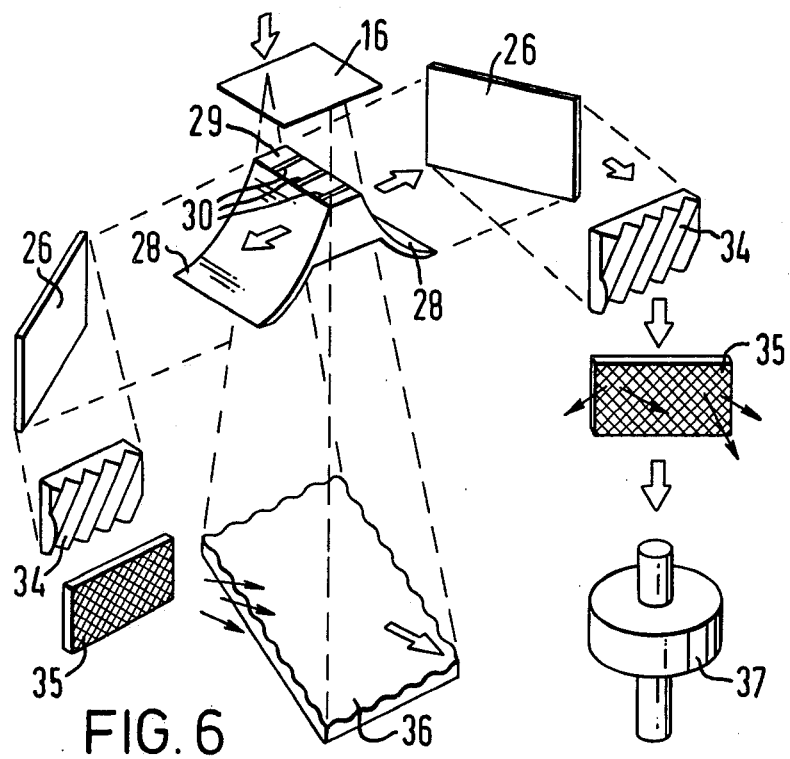
FIG. 6 is an exploded view of the light splitting, condensing, reflective and spreading devices of the light reflector unit.

In use, the light emitted from the flash unit 13 passes into the window 16. Some of the admitted light passes straight through the opening 29 and is directed through a window (not shown) in the bottom of the casing 15 and onto the frusto-conical surface of the reflector member 14 and deflected towards the subject being photographed. The webs 30 serve to confine the light passing through the opening 29 and prevent it spreading. When no reflector 14 is provided, such as in the arrangement shown in FIGS. 1 and 2, then the opening 29 can be blanked-off and there is no window in the bottom wall of the casing. The remainder of the admitted light is split into two paths, one path of light striking the surface of one of the upwardly inclined surfaces 28 and the other striking the surface of the other upwardly inclined surface 28. The inclined surfaces 28 condense the light into beams which are reflected onto the respective interior surfaces of the inclined end walls 26 which deflect the beams of light to the windows 18 where they are diffused and directed to the subject 37 to be photographed. Each of the windows 18 may be provided with a prism or fresnel screen 34 as shown in FIG. 6 and with a frosted screen 35. As will be seen from FIG. 6, the reflector member 14 can be provided with or replaced by a reflector 36.

The upwardly inclined surfaces 28 may be curved or concave with the concavity directed towards the interior of the unit 24. It will be seen therefore that the light reflector unit 13 splits up the light received from the flash gun 13 into three paths, two of these paths of light being condensed into pencil beams which are directed to optimum positions around the lens unit 11 of the camera 10, and at these positions deflected towards the subject 37 to be illuminated and photographed. On leaving the beam splitter, the light is condensed and the degree of condensation is selected to suit the particular design of light reflector unit 12.

Figure 7:
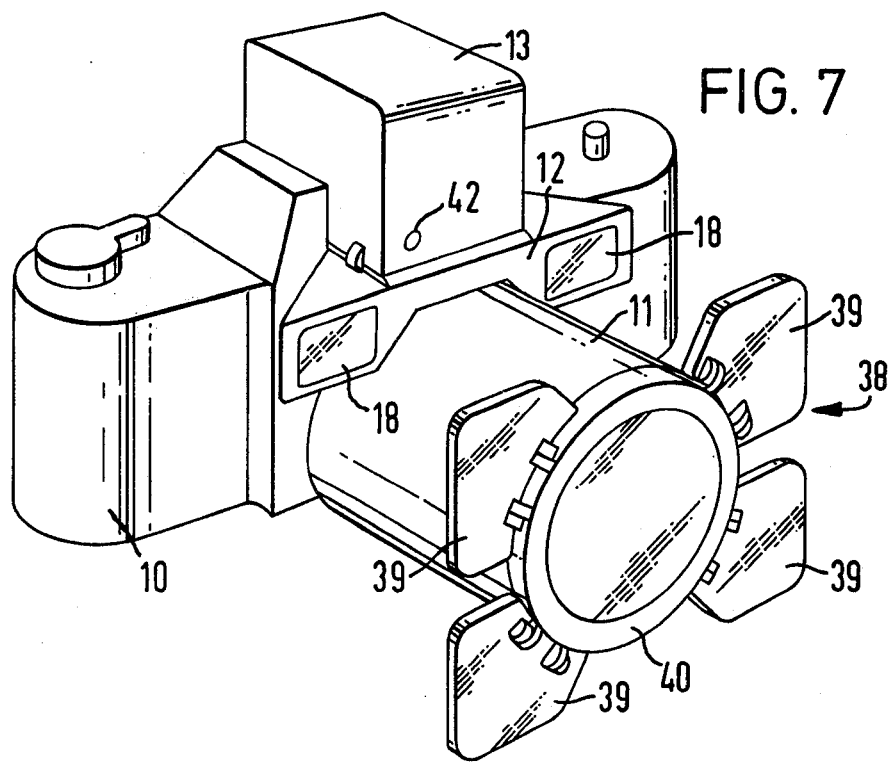
FIG. 7 is a diagrammatic perspective view of a camera provided with a light source, a reflector device according to the present invention and hinged deflectors and/or diffusers.

In the embodiment shown in FIG. 7 the light reflector unit 12 is either not provided with the opening 29 or the opening 29 is blanked-off and the light received from the flash gun 13 is split and condensed into two beams which are directed to the windows 18. Mounted on the end of the lens unit 11 is a diffuser 38. The diffuser 38 may consist of an annular diffuser or as shown in FIG. 7 a plurality of deflectors and/or diffusers 34 hinged to a mounting ring 40. Only two deflectors and/or diffusers 39 will be used at any one time. This arrangement enables any length of lens unit 11 to be fitted to the camera 10 without it obscuring the light directed towards the subject to be photographed. The required exposure can be calculated by meansuring the distance between the diffuser 38 and the subject and not the flash to the subject distance via the beam splitter.

The light reflector unit 12 produces an even illumination of the subject 37 at close range, i.e. 30 mm or less. Colour filters can be used with the windows 18 of the unit 12 to give special effects. Each beam of light may be controlled with lenses deflectors and/or light absorbing screens to vary the lighting on the subject, i.e. to produce shadows on one side. Closeup frames may be used to surround the light reflector unit 12 without any shadows of the frame appearing on the subject.

If the diffuser/deflector 38 shown in FIG. 7 is removed the two concentrated light beams from the unit 12 can be used to illuminate a distant subject.

The flash gun 13 can be detached from the unit 12 and can be used in a conventional manner.

Figure 8:
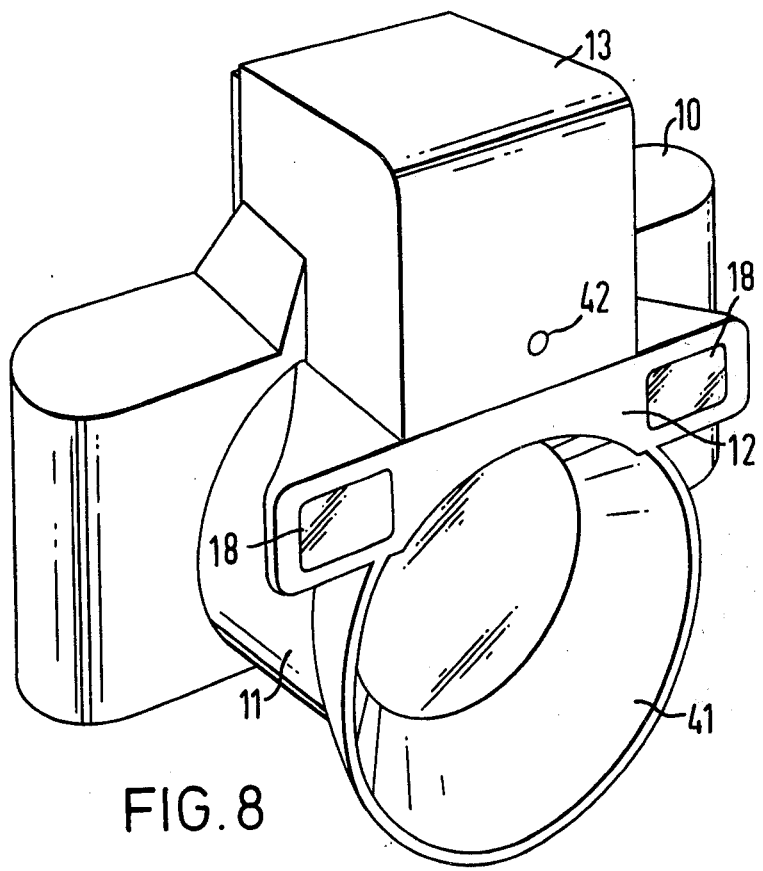
FIG. 8 is a diagrammatic perspective view of an embodiment of a light reflector unit according to the present invention provided with a frusto-conical reflector.

FIG. 8 shows a reflector member 41 which is integral with the reflector unit 12. The reflector member 41 will bounce back light reflected from the subject 37 and surroundings to give "fill-in" lighting.

In all the embodiments described the flash gun 13 can be replaced by a constant light source, i.e. a tungsten light source. This enables the photographer to see the effect of the lighting on the subject 37 before actuating the shutter of the camera 10. The flash gun 13 can be provided with a light sensor 42.

Figure 9:
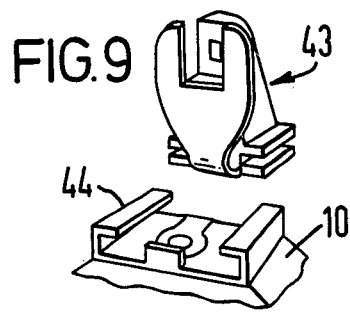
FIG. 9 illustrates a bracket for providing physical and electrical connection of a flash unit to the hot shoe of a camera.

FIG. 9 illustrates a mounting bracket 43 which can be attached to the conventional hot shoe of a camera 10 and used for holding a flash gun 13 on the camera 10.

Figure 10:
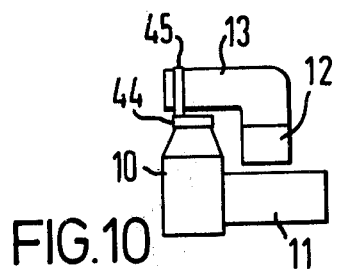
FIGS. 10 and 11 show diagrammatically the flash gun and light reflector unit in the two positions on the camera using a reversible bracket.
Figure 11:
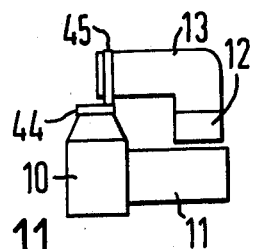

FIGS. 10 and 11 illustrate a reversible mounting bracket 43 which can be attached to the conventional hot shoe 44 of a camera 10 and used to hold a conventional flash gun 13 in the desired position on the camera 10, i.e. with its light emitting face directed downwardly. The reversible bracket 43 has a mounting flange 45 extending upwardly from one edge. When the bracket 43 is connected to the hot shoe 44 with the flange 45 rearmost the reflector unit 12 which is connected to the flash gun 13 will be close to the body of the camera 10 as shown in FIG. 10 and when the bracket 43 is connected to the hot shoe 44 with the flange 45 forwardmost the reflector unit 12 will be located at or near the forward end of the lens unit 11 of the camera 10 as shown in FIG. 11.

FIGS. 12 and 13 illustrate a mounting clip 46 which can be fastened to the flash gun 13 by screws or by an adhesive and used for mounting the reflector unit 12 on the flash gun 13. The mounting clip 46 comprises a flat body portion 47 provided with an aperture 48 to allow light to pass through it, and at each side the body portion 47 is provided with a pivotable clamp member 49 which engages with the undercut or dovetail section recess 22 provided on the top of the casing of the reflector unit 12. The two clamp members 49 are caused to pivot by the application of manual force to disengage them from the recesses 22 in order to detach the unit 12 from the flash gun 13. The clamp members 49 can be spring loaded or simply be resilient.

FIG. 14 shows two different forms of lens which can be used in the windows 18 of the unit 12. That shown at 50 is symmetrically concave whilst that shown at 51 is assymetrically concave. The spread of light from lens 50 will be symmetrical whilst that from lens 51 will have a sideways deflection, as shown in FIG. 15.

Figure 16:
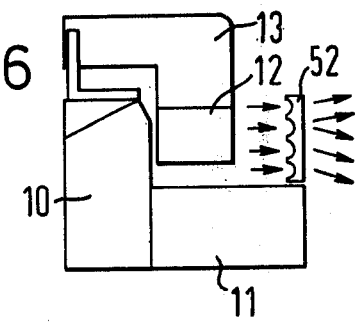
FIG. 16 shows diagrammatically a side elevation of a camera provided with a light source and a light reflector unit according to the present invention and a multi-lens panel in front of the light reflector unit.
Figure 17:
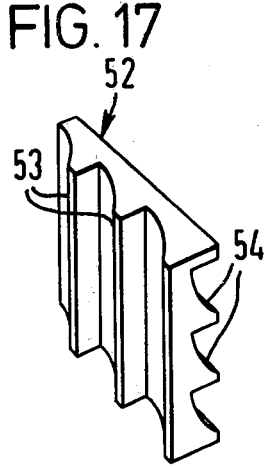
FIG. 17 is a perspective view of a suitable multi-lens panel.

FIG. 16 shows the end of the lens unit 11 provided with a multi-lens panel 52. The panel 52 is shown in greater detail in FIG. 17, and the arcuate vertical surfaces 53 on one side and arcuate horizontal surfaces 54 on its other side.

Figure 18:
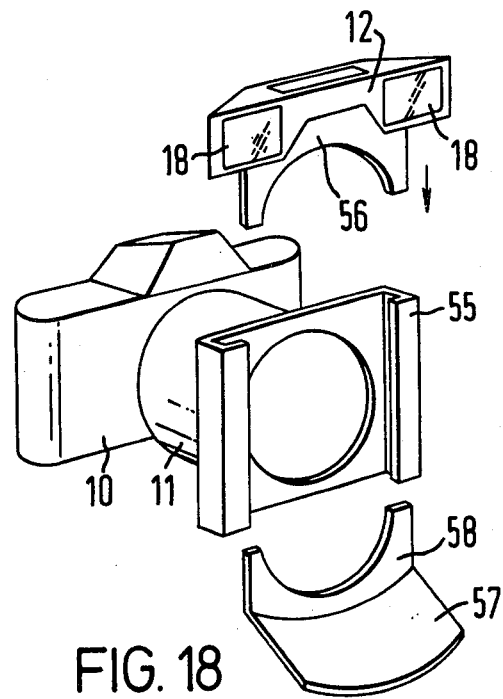
FIG. 18 is a diagrammatic perspective view showing how the light reflector unit can be carried by a filter holder on a camera.

FIG. 18 shows diagrammatically a filter holder 55 provided on the end of the lens unit 11. The reflector unit 12 is provided with a mounting flange 56 having an arcuate portion which surrounds the lens of the unit 11 and which is received in the holder 55. A reflector 57 which receives light from the unit 12 is provided with a mounting flange 58 which surrounds the lens of the unit 11 and which is received in the holder 55.

Figure 19:
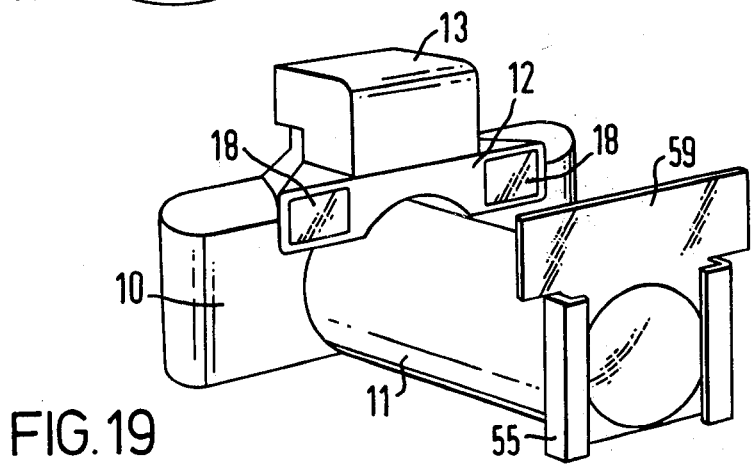
FIG. 19 shows a light diffuser carried by a filter holder on a camera.

In FIG. 19 the filter holder 55 carrier a diffuser 59 for diffusing the beams of light emitted from the windows 18 of the reflector unit 12.

It will be appreciated that there may be more than two windows 18 provided on the reflector unit 12 and these may be arcuate in front elevation. It is also possible to provide an annular window from which the reflector light is directed towards the subject.

I claim:

1. A light reflector unit for use with a photographic camera for reflecting light from a light source towards a subject to be photographed, said unit comprising a hollow casing which can be positioned on a camera between a light source and the lens unit of the camera, a window in the casing for admitting light from said light source into the casing, at least one light emitting outlet from the casing, means for positioning the casing with said outlets facing the same direction as the lens unit of said camera, means within the casing for splitting the admitted light, means for condensing at least some of the admitted light into at least two beams of light, and light reflective surfaces within the casing for reflecting each beam of light to said light emitting outlet, said outlet being provided with a lens or a diffuser.

2. A light reflector as set forth in claim 1 wherein said outlet is arcuate and is adapted to be positioned at least partially surrounding the lens unit of the camera.

3. A light reflector as set forth in claim 1 including a plurality of said outlets adapted to be disposed at discrete locations around the lens unit of a camera, said light reflective surfaces reflecting at least a portion of each beam of light to one of said outlets.

4. A light reflector unit as set forth in claims 1, 2, or 3 in which the casing is provided with an opening which directs some light from said light source directly across the casing onto a reflector located beneath said casing.

5. A light reflector unit as set forth in claims 1, 2, or 3 further including a diffuser for each outlet.

6. A light reflector unit as set forth in claims 2 or 3 wherein the casing includes a hollow casing member open at its forward face, and a unit which is received in the casing member mounting said means for splitting the admitted light, said means for condensing the light into two or more beams, said light reflective surfaces and said light emitting outlets.

7. A light reflector unit as set forth in claim 6 including a lens carried on a cover plate for each light emitting outlet.

8. A light reflector unit as set forth in claims 1, 2, or 3 wherein said means for splitting the admitted light comprises two upwardly extending light reflective surfaces inclined towards each other at their upper ends.

9. A light reflector unit as set forth in claims 1, 2, or 3 wherein said means for positioning said casing includes means for attacing said unit to a light source.

10. A light reflecting unit as set forth in claim 9 wherein said means for attaching comprises a plate which can be secured to said light source, said plate including pivotable clamp members each of which engages a recess provided on the upper wall of said casing.

11. A light reflector unit as set forth in claim 9 wherein said means for attaching includes a mounting flange provided on the casing and which can be fixed to a filter holder provided on the lens unit of the camera.

12. A light reflector unit as set forth in claims 1, 2, or 3, further including a frusto-conical deflector adapted to extend around the lens unit of a camera.

* * * * *